United States Patent [19]

Hartwig et al.

[11] 4,007,034
[45] Feb. 8, 1977

[54] METHOD FOR MAKING STEEL

[75] Inventors: Jürgen Hartwig, Essen; Dieter Neuschütz, Langenfeld; Dietrich Radke, Essen, all of Germany

[73] Assignee: Fried. Krupp Gesellschaft mit beschrankter Haftung, Essen, Germany

[22] Filed: May 21, 1975

[21] Appl. No.: 579,738

[30] Foreign Application Priority Data

May 22, 1974 Germany .............................. 2424932

[52] U.S. Cl. ........................................ 75/46; 75/36; 75/38; 75/40
[51] Int. Cl.² ............................................ C21C 5/00
[58] Field of Search ............ 75/38, 36, 40, 11–13, 75/46, 60

[56] References Cited
UNITED STATES PATENTS

| | | | |
|---|---|---|---|
| 2,750,277 | 6/1956 | Marshall | 75/26 |
| 2,919,983 | 1/1960 | Halley | 75/38 |
| 2,928,730 | 3/1960 | Luerssen | 75/38 |
| 3,145,094 | 8/1964 | Nakajima | 75/38 |
| 3,151,973 | 10/1964 | Halley | 75/38 |
| 3,163,520 | 12/1964 | Collin et al. | 75/38 |
| 3,264,096 | 8/1966 | Agarwal et al. | 75/40 |
| 3,454,395 | 7/1969 | Von Stroh et al. | 75/40 |
| 3,864,122 | 2/1975 | Seelig et al. | 75/38 |

FOREIGN PATENTS OR APPLICATIONS

| | | | |
|---|---|---|---|
| 1,266,330 | 4/1968 | Germany | 75/38 |
| 927,309 | 5/1963 | United Kingdom | 75/38 |

Primary Examiner—M. J. Andrews
Attorney, Agent, or Firm—Spencer & Kaye

[57] ABSTRACT

A method is provided for producing steel from iron oxide-containing raw materials. The raw materials are initially converted, in a reduction furnace by direct reduction with a reducing gas, to a substantially metallized sponge iron. The metallized sponge iron is then melted with the addition of additives and possibly fine scrap in a melting vessel filled with a metal melt. Heat and carbon monoxide-containing exhaust gases are formed in the melting vessel due to the reaction of oxygen-containing gases with carbonaceous material. The heat is utilized in part to melt the sponge iron and the exhaust gases are utilized for the direct reduction. The melt is then transferred to a further vessel where it is further processed into steel by means of suitable metallurgical measures. In the process, the entire, strongly-heated exhaust gas from the melting vessel is caused to react in a reactor with (1) carbonaceous material, and with (2) water vapor and/or carbon dioxide. After suitable conditioning, this exhaust gas is utilized for the direct reduction of the iron oxide-containing raw materials. An exhaust gas is formed in the direct reduction furnace during the direct reduction, and part of this exhaust gas is conducted through a gas processing system and combined with the conditioned exhaust gas from the melting vessel to form the reducing gas used in the direct reduction furnace.

14 Claims, 1 Drawing Figure

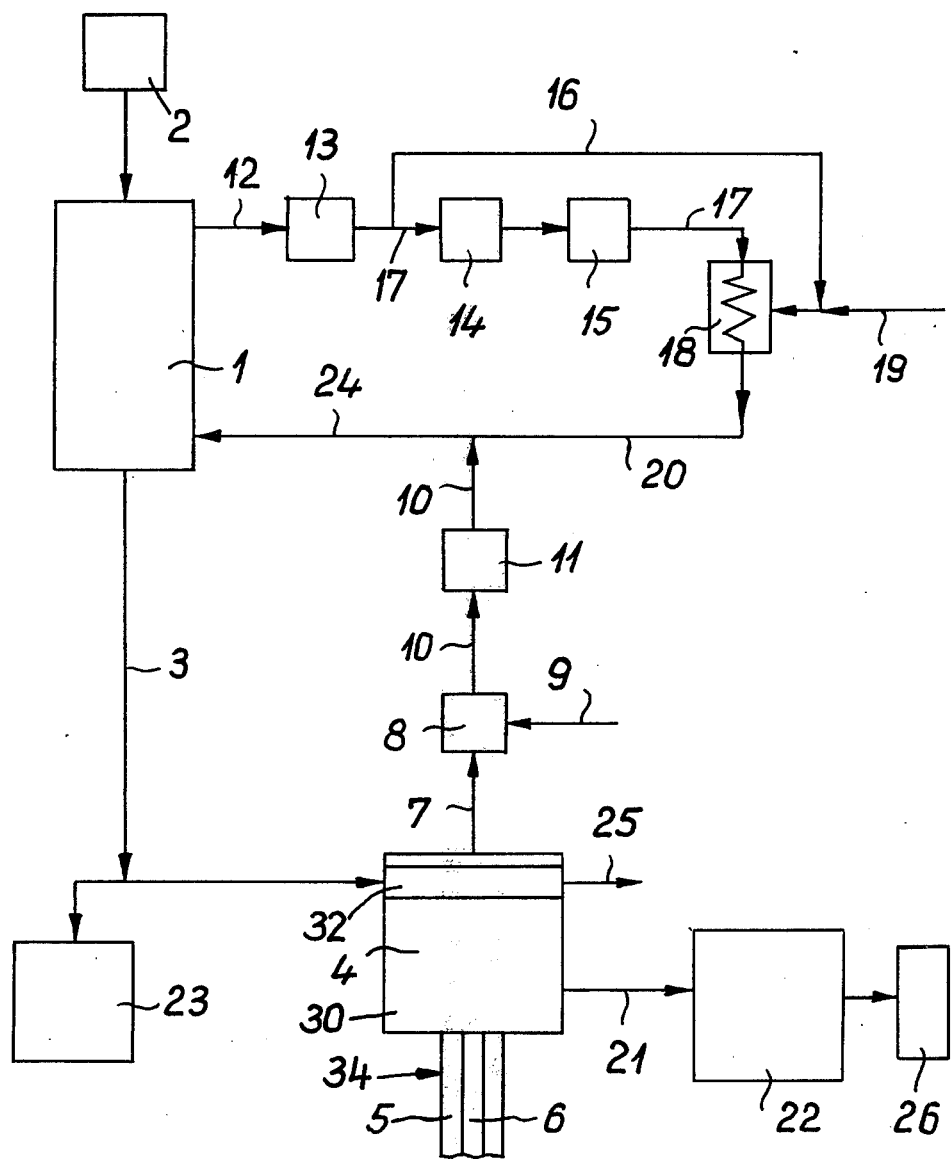

METHOD FOR MAKING STEEL

BACKGROUND OF THE INVENTION

The present invention relates to a method for making steel from iron oxide-containing raw materials and more particularly to a method in which the raw materials are initially converted by direct reduction with a reducing gas to substantially metallized sponge iron which is then melted in a melting vessel filled with a metal melt.

It is known that sponge iron can be produced by reducing fine-grained iron ores in a fluidized bed reactor with gaseous reduction agents, such as, for example, carbon monoxide and hydrogen. The metallic iron contained in the so-produced fine-grained sponge iron is easily reoxidized. Therefore, the fine-grained sponge iron must be protected against reoxidation before it is melted (which melting is usually a discontinuous process) by changing it into a solid form by means of so-called hot briquetting or by storing and transporting it in inert gas.

In order to be able to effect the melting of the sponge iron at a justifiable cost, the sponge iron must contain as large an amount as possible of metallic iron. The high degree of metallization of the sponge iron desired in the reduction of the ore produces high costs, however, and requires particularly effective protective measures to prevent reoxidation.

It is also known to melt sponge iron by adding electrical energy or combustion heat in a suitable apparatus. Natural gas, crude oil and coal can be used to produce the combustion heat. Suitable melting devices are hearth furnaces (electric arc furnaces, Siemens-Martin furnaces), shaft furnaces (blast furnaces, cupola furnaces, electric low-shaft furnaces) and crucibles (oxygen refining converters) in which in addition to the melting process, alloying, final reduction and/or refining processes can also take place. Thus, it is possible, for example, to melt sponge iron in a blast furnace and at the same time subject it to a final reduction, the end product being pig iron which is rich in carbon. When pig iron is refined in a converter, the carbon contained in the pig iron to an amount up to 4% is burned by the blown-in air or oxygen and the heat produced by this process can be utilized to melt the sponge iron. The capacity of the converter for sponge iron to be melted is undesirably limited, however, by the carbon content of the pig iron in the converter. Further, the nozzles with which the oxygen is introduced into the liquid pig iron are subject to heavy mechanical, thermal and chemical stresses which lead to malfunctions in the refining and melting processes. Many attempts have therefore been made to introduce larger quantities of heat into the converter by suitable measures and to reduce the stresses inherent in the process to which the oxygen injection devices are subjected. In one such prior art method, the metal bath in the converter has been heated by an oil heating system operated with oxygen, but this method has not found acceptance because the capacity of the converter for sponge iron to be melted could not be substantially increased in view of economical considerations due to insufficient heat transfer from the combustion gases to the metal bath.

It is also the custom to introduce the sponge iron to be melted into the converter in charges and to remove the molten steel present after the refining process in a discontinuous manner so that longer starting and dead times are encountered for the converter.

It is also known to melt sponge iron by introducing an oxygen-containing gas and carbonaceous material, preferably solid carbonaceous dust, such as coal dust or coke dust, into a melting vessel containing a metal bath. In this process, the oxygen-containing gas and carbonaceous material preferably are blown into the metal melt below the bath surface and take part in a reaction with each other which produces heat and a carbon monoxide-containing exhaust gas. In such a process, this heat can be utilized in part for melting the sponge iron in the melting vessel and the exhaust gas can be utilized in part for the direct reduction of the iron ore and in part in some other way, or can be utilized entirely in some other way. The melt can then be conducted into a further vessel in which it is processed to steel by suitable metallurgical measures.

An improved process for making steel from fine-grained iron ores is described in U.S. Pat. Application Ser. No. 540,957, filed on Jan. 14, 1975, in the name of Rolf Wetzel et al, assigned to the same assignee as the present application, and incorporated herein by reference. The process described in U.S. Patent Application Ser. No. 540,957 includes the steps of (a) preheating and partially reducing the fine-grained iron ores in a countercurrent heat exchanger; (b) reducing the preheated and partially reduced fine-grained iron ores to fine-grained sponge iron, preferably at 500° to 850° C, with exhaust gas which consists essentially of carbon monoxide and which emanates from a melting vessel in which sponge iron is melted; (c) separating the fine-grained sponge iron formed in the fluidized bed reactor from reduction gas which forms during the reduction in the fluidized bed reactor and pneumatically transporting the separated sponge iron into a carbon-containing metal melt in the melting vessel; (d) melting and finally reducing the sponge iron in the metal melt with the carbon in the metal melt and with further carbonaceous material, preferably coal dust, which is pneumatically introduced into the metal melt; (e) refining the metal melt with pure oxygen to which lime and further additives may have been added; and (f) introducing the oxygen, the carbonaceous material, and the sponge iron into the metal melt through at least one nozzle which is disposed below the surface of the metal melt. In the process described in Patent Application Ser. No. 540,957, the exhaust gas from the melting process is divided into a plurality of streams some of which are then used in various parts of the process, such as, for example, as carrier streams for introducing the sponge iron into the metal melt and as reducing gas. In addition, a preliminary steel is taken from the melting vessel and is refined to steel in a further vessel.

SUMMARY OF THE INVENTION

It is a primary object of the present invention to produce steel continuously and economically by reducing iron ores to sponge iron and melting the sponge iron and refining the melt.

Another object of the present invention is to improve the economy of operation and expand the field of application of prior art processes which produce steel from sponge iron formed from iron ore.

A further object of the present invention is to provide such a process for producing steel wherein the quantities of materials and energy of the process are better utilized, and to permit the use of materials of various and different compositions and grain sizes.

Additional objects and advantages of the invention will be set forth in part in the description which follows, and in part will be obvious from the description, or may be learned by practice of the invention. The objects and advantages are realized and attained by means of the steps and combination particularly pointed out in the appended claims.

To achieve the foregoing objects and in accordance with its purpose, this invention provides a process for producing steel from iron oxide-containing raw materials which comprises the steps of: initially converting the raw materials, in a reduction furnace by direct reduction with a reducing gas, to a substantially metallized sponge iron; separating the sponge iron formed in the reduction furnace from exhaust reduction gas which forms during the reduction in the reduction furnace and transporting the separated sponge iron into a metal melt in a melting vessel; melting and finally reducing the sponge iron in the metal melt with carbonaceous material which is introduced into the metal melt and with oxygen introduced into the metal melt via an oxygen-containing gas, with heat and strongly-heated carbon monoxide-containing exhaust gas being formed in the melting vessel due to the reaction of the oxygen with the carbonaceous material; reacting the entire strongly-heated carbon monoxide-containing exhaust gas from the melting vessel in a reactor with (1) carbonaceous material and (2) with water vapor and/or carbon dioxide to form a first reducing gas stream; introducing the first reducing gas stream into the reduction furnace as reducing gas for the direct reduction of the iron oxide-containing raw materials; conducting a portion of the exhaust gas formed in the direct reduction furnace through a gas processing system to form a second reducing gas stream; and introducing the second reducing gas stream into the reduction furnace as reducing gas for the direct reduction of the iron oxide-containing raw materials.

Generally, the melt after melting of the sponge iron is transferred to a further vessel where it is further processed into steel by means of suitable metallurgical techniques. The process of the present invention can be used with particular advantage if the exhaust gas from the melting vessel enters the reactor at a temperature of from 1400° to 1600° C and leaves it at the temperature of from 800° to 1100° C, which is the temperature required for the direct reduction. The heat content of the strongly-heated exhaust gas from the melting vessel is used in the reactor to provide the heat required for the following endothermal reactions:

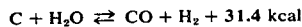

$$C + H_2O \rightleftarrows CO + H_2 + 31.4 \text{ kcal}$$

$$C + CO_2 \rightleftarrows 2CO + 41.2 \text{ kcal}$$

whereby this exhaust gas of the melting vessel is cooled and at the same time hydrogen and additional carbon monoxide are formed which are desirable for the direct reduction.

The process sequence is particularly favorably influenced according to the present invention if the reactor is an integral part of the melting vessel. It is especially advantageous for the upper portion of the melting vessel, in which no melt is present to serve as the reactor. In a further preferred embodiment of the process of the present invention, the melting vessel is designed as a pressure vessel to permit the exhaust gas of the melting vessel, which is under increased pressure, to flow through the reactor and the reduction furnace at the speed required for the reduction process without additional compression. It is particularly advantageous for the exhaust gas of the melting vessel to be at a pressure of from 0.5 to 5 atmospheres gauge in the melting vessel.

In the practice of the present invention, the first reducing gas stream formed from the exhaust gas of the melting vessel is combined with the second reducing gas stream formed from the exhaust gas of the reduction furnace and supplies heat to the second reducing gas stream to bring it to the temperature necessary for the direct reduction in the reduction furnace.

In a further preferred embodiment of the invention, it is advantageous for the quantity of heat required to maintain the temperature of the second reducing gas stream at the temperature necessary for the direct reduction to be obtained not only from the first reducing gas stream, but also to be obtained from burning a portion of the exhaust gas from the reduction furnace that is not used to form the second reducing gas stream. In many cases, it may also be advisable to heat the second reducing gas stream by the addition of nuclear process heat.

The process of the present invention provides numerous advantages among which are that neither shaft furnace coke nor electrical energy is required for producing steel via the intermediate stage of sponge iron. In addition, the energy balance of the process approximately coincides with that of the shaft furnace oxygen blowing process. Moreover, the process of the present invention is continuous so that unproductive dead times of the process equipment are avoided.

The process of the present invention enables large amounts of sponge iron to be melted and permits continuous removal and addition of materials to the metal melt. The oxygen stream introduced into the metal melt can contain caustic lime and the sponge iron introduced into the metal melt can be partly replaced with scrap. The oxygen and carbonaceous material required for the melting process preferably are blown into the metal melt in immediate proximity to one another at a point below the surface of the metal melt. Preferably, the oxygen stream is introduced into the metal melt through an opening in a nozzle and the carbonaceous material is introduced into the metal melt through at least one further opening in the same nozzle. More than one stream of oxygen can be introduced into the melting vessel and for each such stream there are corresponding streams for introducing carbonaceous material.

In order to be able to introduce the carbonaceous materials into the melting vessel through nozzle openings below the surface of the melt, the carbonaceous material preferably is suspended in a suitable carrier gas.

It is to be understood that both the foregoing general description and the following detailed description are exemplary and explanatory, but are not restrictive of the invention.

BRIEF DESCRIPTION OF THE DRAWING

The accompanying drawing illustrates an example of a preferred embodiment of the invention and together with the description serves to explain the principles of the invention.

The sole FIGURE of the drawing provides a schematic representation of an apparatus that can be used in accordance with the teachings of this invention to practice the process of this invention.

DETAILED DESCRIPTION OF THE INVENTION

The process steps which comprise the process of the present invention are attuned to one another so that the process is continuous.

In the practice of the present invention, iron ores are directly reduced in a direct reduction furnace. The iron ores used in the direct reduction can be of any type used in known reduction processes, such as hematite or magnetite ores or iron oxide concentrates in the form of hematitic pellets or green pellets. The type of furnace used for the direct reduction process may be any shaft furnace using gaseous reduction media. The grain size of the iron ore can be from 1 to 100 mm and preferably is from 5 to 35 mm.

The direct reduction of the iron ores is effected with a reducing gas developed from two streams including a first stream developed from another part of the process where sponge iron is melted in a melting vessel in which a metal melt is being refined and from which an exhaust gas is produced which essentially contains carbon monoxide and a second stream developed from the exhaust gas from the reduction of the iron ore to sponge iron. These two streams and their use as the reducing gas for the direct reduction in the reduction furnace will be described in greater detail hereafter. The use of these two exhaust gas streams to form the reducing gas and reduce the iron ores has a favorable effect on the overall energy balance of the process. The reducing gas introduced into the direct reduction furnace generally is at a temperature of from 800° C to 1100° C, and preferably is at a temperature of about 900° C to bring about direct reduction of the iron ore to sponge iron. At these temperatures, the iron ore is reduced in the direct reduction furnace to such an extent that the degree of metallization of the sponge iron is between 60 and 98%, and preferably between 85 to 95%. The degree of metallization which is best suited for the process depends, for example, on the size of the installation and on the quantities of further materials to be melted which might possibly be added to the melting vessel.

During production of the sponge iron in the reduction furnace, reduction exhaust gases are formed, which leave the furnace at the top of the shaft. The sponge iron produced in the furnace reactor leaves the furnace at the bottom of the shaft by means of a gas lock. The sponge iron, which is preferentially discharged from the furnace at temperatures between 600° and 900° C, can be directly transferred to the melting vessel by means of a chute preferably under a non-oxidizing atmosphere. The sponge iron is then led to a melting vessel where it is melted and final reduction occurs.

The sponge iron that is introduced into the metal melt is melted in the melting vessel and is finally reduced with the carbon in the metal melt and with further carbonaceous material which is introduced into the metal melt.

A stream of oxygen-containing gas also is introduced into the metal melt in the melting vessel to bring about combustion of carbon and carbonaceous material and effect refining of the metal melt. The oxygen-containing gas stream can have suspended in it caustic lime (CaO) in finely divided form (lime dust). The addition of lime is generally necessary in order to bind the phosphorus, silicon and sulfur impurities in the melt. The fine lime dust generally has a particle size ranging from finest e.g. less than $1\mu$ to about 3 mm. The oxygen-containing stream in which fine caustic lime may be suspended preferably is introduced into the metal melt below the melt surface. The oxygen-containing gas stream can be introduced in accordance with known oxygen blowing processes in which oxygen is partially blown into the metal bath with an oxygen blowing lance. Generally, the oxygen stream contains pure oxygen as the only gas in the oxygen stream and is introduced at a rate of $0.5 Nm^3$/minute $x$ ton, to $6 Nm^3$/minute $x$ ton. Instead of pure oxygen, air enriched with oxygen can be introduced into the metal melt as the stream of oxygen-containing gas.

The carbonaceous material that is added to the metal melt can be a hydrocarbon such as a liquid hydrocarbon, but preferably is in the form of solid, carbonaceous dust and preferably is added to the metal melt below the surface of the melt. The carbonaceous dust is a carbon-containing material in a finely divided state and can, for example, be solid carbon particles or can be in the form of coal dust. Preferably, the solid carbonaceous dust is coal dust. In general, all types of pulverized coal, for example, brown coal, hard coal and high-volatile coal can be used in the process as well as pulverized coke. It is also possible to use solid residues from petroleum processing which can be made into dust-like products by the addition of suitable materials, such as for example, alumina. Moreover, it is possible to use fine-grained calcium carbide as the solid carbonaceous dust.

The solid, carbonaceous dust particles preferably are pneumatically carried to the metal bath by a carrier gas. The solid carbonaceous dust particles should be substantially free of any water adhering to them before they are suspended in the carrier gas and generally any well known technique can be used to insure that the carbonaceous particles are free of water. When the carbonaceous dust particles are prepared from coal, the coal can be thoroughly dried by steam before it is ground into coal dust.

The carbonaceous dust is combusted with oxygen in the melting vessel in an exothermic reaction which supplies heat to the melting vessel and produces an exhaust gas consisting essentially of pure carbon monoxide. The heat generated from this combustion is used to melt the sponge iron that is added to the metal melt. The solid carbonaceous dust effects final reduction of the sponge iron and maintains the temperature of the metal melt.

In the process of the present invention, between 0.7 and 1.3 $Nm^3$ of oxygen are used to burn 1 kg of carbon into carbon monoxide. This reaction produces 2469 Kcal, per kg of carbon, of which about 1069 Kcal are removed from the melting vessel by the carbon monoxide exhaust gas leaving the melting vessel so that 1400 Kcal remain in the melting vessel and can be utilized for the melting process. Since the carbon content of the carbonaceous material varies with different materials and the sponge iron that is to be melted in the bath often contains different amounts of iron, it is necessary to vary the quantity of carbonaceous material accordingly. The amount of carbonaceous material added to the metal bath can range, for example, from 100 kg/t of sponge iron to 400 kg/t of sponge iron and can have a size range from less than 1μ to 3 mm. Optimum final reduction of the sponge iron is attained if the carbon content of the metal melt in which the sponge iron is being melted does not drop below 0.1% during the refining with oxygen. This metal melt has only the quality of a preliminary steel and is set to the desired carbon content in a further metallurgical vessel by blowing with oxygen.

The carbonaceous material preferably is introduced into the melting vessel by a carrier gas consisting of carbon monoxide, although any other gas, such as argon or nitrogen, which does not react, or reacts only to a slight degree, with the substances suspended in the carrier gas and which has no negative effect on the composition of the molten metal and the exhaust gases can be used. The carrier gas introduced into the melting vessel acts together with the combustion gases produced in the melting vessel to effect an intensive mixing of the metal melt and thus produces uniform temperature and concentration conditions in the melting vessel.

For the pneumatic conveyance of the carbonaceous dust, generally 3 to 25 Nl carrier gas is required per kg of solids. The particle size of the solids in the carrier gas preferably should be at most 1/10 of the narrowest conveying cross section and preferably should be about 20μ. The carrier gas and solids therein are transported by gas line and can be introduced into the melting vessel through one or more nozzles. The pressure with which the starting materials are introduced into the melting vessel is adapted to the respective dimensions of the vessel, its fill level and the number of nozzles. The pressure can range, for example, from 3 bar to 40 bar and the number of nozzles can be from 1 to 30.

The starting materials of oxygen, and carbonaceous material can be introduced into the melting vessel by a number of techniques. In a preferred embodiment of the invention, the oxygen, the carbonaceous material, and further additives which one may want to add to the metal melt, are introduced into the metal melt through one or a plurality of multiple jacket nozzles. In order to prevent iron oxidation during the refining process and to maintain the carbon content of the metal melt having a preliminary steel quality so that the final reduction of the sponge iron can take place the various substances preferably are introduced into the metal melt through the individual, concentrically disposed pipes of a multijacket nozzle. Thus, a multijacket nozzle can be provided having an inner pipe and an outer pipe, with the oxygen, to which fine-grained lime and/or further additives may have been added being introduced through the inner pipe and carbonaceous material being introduced through the outermost pipe.

In addition to introducing the carbonaceous material into the melting vessel, other materials such as scrap and ore such as iron ore can also be introduced into the melting vessel. The adding of ore and scrap to the melting vessel increases the amounts of oxygen and carbonaceous material that must be added to the metal melt to bring about the melting in the melting vessel and also increases the amount of exhaust gas that is formed in the melting vessel.

The metal melt can be started up by adding molten pig iron to the melting vessel. During operation, the sponge iron that is added to the metal melt can comprise from less than 1 kg/minute $x$ ton of the metal melt to 60 kg/minute $x$ ton of the metal melt. Scrap can comprise less than 1 kg/minute $x$ ton of the metal melt to 60 kg/minute $x$ ton of the metal melt and ore can comprise 0 to 20 percent of the metal melt. The ore that can be added to the metal melt can be iron ore, manganese ore, nickel ore, or cobalt ore, and this ore is refined in the metal melt.

The melting vessel produces a liquid preliminary steel and this steel can be continuously removed from the melting vessel and introduced into a refining converter where further or final refining takes place. In the refining converter, the preliminary steel can be blown with oxygen to obtain a desired required final carbon content.

As previously stated, the exhaust gas from the melting vessel is treated to form a first reducing gas stream. This treatment comprises reacting all of the exhaust stream from the melting vessel with (1) a carbonaceous material and with (2) water vapor and/or carbon dioxide. The carbonaceous material used in this reaction preferably is a carbon dust, such as coal dust or coke dust, as described above in connection with the carbonaceous material added to the metal melt. the carbonaceous material can be introduced in a gas stream with the water vapor and/or carbon dioxide that is used in the reaction with the exhaust gas of the melting vessel. The resulting gas mixture produced in the reaction is preferably conditioned, such as by removing dust from it, and the entire gas mixture then serves as the first reducing gas stream that is added to the reduction furnace.

The exhaust gas stream leaving the reduction furnace is treated in a gas processing system and provides a second reducing gas stream which is returned to the reduction furnace. After leaving the reduction furnace, this exhaust gas stream preferably is treated to remove dust and water from it, and then is divided into a first partial stream, the relative amount of which being between 5 and 40% of the whole exhaust gas stream, and a second partial stream. This second partial stream is then further treated by first removing water and $CO_2$ from it, then having it take part in a water gas reaction to form $CO_2$ and additional $H_2$ in it, and finally having it heated by heat formed from the burning of the first partial stream. The treated and heated second partial stream is now in the form of a second reducing gas stream and can be combined with the first reducing gas stream formed from the exhaust gas of the melting vessel to produce the reducing gas used in the reduction furnace.

The quantity of reducing gases used in the reduction step is chosen so that the iron ore is heated in the reduction furnace to a temperature of about 800° to 1100° C. At these temperatures, the iron ore is subjected to a reduction because the reducing gas developed from the first and second reducing gas streams contains a large percentage of carbon monoxide, for example, from about 60 to 90%. Generally, the amount of reducing gas used in the reduction of the iron ore can be from 1200 to 3000 Nl per kg of iron ore and the volume ratio of the first reducing gas stream from the melting vessel to that of the second reducing gas stream from the exhaust gas of the reduction furnace can vary from 1 : 1 to 1 : 4.

The process of the present invention provides readily available means for controlling and regulating the process parameters and conditions. Thus, for example it is possible to vary the quantity and/or composition of the reduction gas used to reduce the iron ore to sponge iron in the reduction furnace. By changing the composition and quantity of the reduction gas, the degree of metallization of the resulting sponge iron is changed. The composition of the reduction gas can be changed by changing the volume ratio of the second reducing gas stream from the reduction furnace to that of the first reducing gas stream from the melting vessel. Further, by adding ore and/or scrap into the melting vessel, the quantity of carbonaceous material and oxygen that has to be added to the melting vessel is increased and there is an increase in the amount of exhaust gas formed in the melting vessel.

Further since the process of the present invention is continuous, the quantities of carbonaceous material, of scrap, and of sponge iron can be varied in mutual dependence upon one another in order to regulate the metal melt temperature and the carbon content of the metal melt. If, for example, the oxygen content and the quantity of carbonaceous material are increased, the input of sponge iron can be increased with the quantity of scrap remaining the same without there occurring a change in the bath temperature. This control of the quantities of the streams can also be used to set the carbon content in the metal bath so that it is particularly favorable for melting solid metal additives, such as, for example, sponge iron or scrap, or so that certain metallurgical reactions will be enhanced, for example, the removal of sulfur for instance by adding lime.

The present invention for producing steel provides a number of advantages as compared to the prior art. The continuous operation of the process shortens the starting and dead times for the individual components in the process and avoids intermediate storage and reoxidation of the sponge iron.

The use of solid carbonaceous material, and particularly coal dust, reduces the expenditures for the melting process and results in an economical and efficient operation. Further, the use of solid carbonaceous dust increases the melting output of the converter and the operational safety of the exhaust gas system.

In addition, the carbon monoxide exhaust gas produced during the melting process is a valuable product and full utilization is made of this exhaust gas by forming it into a reducing gas for the direct reduction in the reduction furnace. In addition, this exhaust gas brings about a thorough mixing of the metal melt and serves as a protective gas for the metal melt. The exhaust gas continuously develops during the melting process and consists of 90 to 99% carbon monoxide.

The process of the present invention enables maximum utilization of the raw materials. The use of coal dust, the optimum utilization of the heat contained in the exhaust gases and use of the carbon monoxide contained in the exhaust gases results in an economical and efficient operation. Moreover, since the heat required to melt the sponge iron is produced within the melting vessel this heat is utilized to its maximum. The process of the present invention is further distinguished by easy controllability and the possibility of using any type of coal.

The process of the present invention enables the carbon content of the metal bath to be controlled by regulating the oxygen and carbon quantities which are added to the metal bath. The carbon content can be controlled to be in an optimum range for a particular purpose during the melting of the sponge iron. For example, the carbon content can be controlled to insure that the dissolution of metallic additives is particularly effective or the removal of sulfur is particularly enhanced.

One embodiment of the process of the present invention is illustrated in the drawing and will be described in detail below.

Iron ore is fed from a supply bunker 2 into a reduction furnace 1 which is operated with a reduction gas 24. The iron ore is reduced in reduction furnace 1 to sponge iron at a temperature up to about 1100° C. The sponge iron is continuously withdrawn in a stream 3 from reduction furnace 1 and is introduced continuously, and preferably without intermediate cooling, into a melting vessel 4.

Melting vessel 4 contains a metal melt 30 and a layer of slag floats on metal melt 30. Melting vessel 4 serves as a melting, refining and final reduction vessel. Metal bath 16 generally has a temperature of 1200° to 1600° C and generally has a carbon content of more than 1%. In addition to adding sponge iron to melting vessels 4, other additives can be added to metal melt 30 including scrap and ore, such as, for example iron ore, manganese ore, nickel ore, or cobalt ore. The additional materials are refined and melted in melting vessel 4.

The heat required for melting the sponge iron and any other additives that may have been added to metal melt 30 is produced by the combustion of carbonaceous material and oxygen from an oxygen-containing gas that are added to metal melt 30. The carbonaceous material and oxygen are preferably added to metal melt 30 by blowing them in through a multiple jacket nozzle 34 which is disposed below the surface of the metal melt. Jacket nozzle 34 contains an inner pipe and a concentrically disposed outer pipe. Preferably, the carbonaceous material added to metal melt 30 is carbon dust and/or coke dust and is added through the outer pipe of jacket nozzle 15 in a stream 5. Preferably, the oxygen-containing gas added to metal melt 30 is pure oxygen and is blown into the metal melt in a stream 6 through the center pipe of jacket nozzle 15. Instead of carbon dust and coke dust, it is possible to use hydrocarbons such as methane, propane, butane, and light fuel oil, and instead of pure oxygen, it is possible to use air enriched with oxygen.

When coke and oxygen are used to produce heat, approximately 320 kg carbon are required to melt 1 ton of sponge iron having an iron content of from 85 to 95 percent. During this reaction, about 600 $Nm^3$ of carbon monoxide are formed which is sufficient to produce 1 t sponge iron.

During the reaction in melting vessel 4, a hot exhaust gas 7 is formed which consists almost quantitatively of carbon monoxide. The hot exhaust gas 7 formed in melting vessel 4 is initially introduced into a reactor 8 which is disposed in the immediate vicinity of the melting vessel 4 or is an integral part thereof. Hot exhaust gas 7 enters reactor 8 at a temperature of from 1400° to 1600° C. A mixture 9 containing (1) carbonaceous material and (2) water vapor and/or carbon dioxide is introduced into the reactor 8 and reacts in reactor 8 in an endothermal reaction which takes heat from and cools hot exhaust gas 7. The quantity and composition of mixture 9 are selected so that the temperature of hot exhaust gas 7 drops by endothermal reactions to 800° to 1100° C from its initial temperature of about 1400° to 1600° C. It is particularly advantageous for mixture 9 to consist of carbon dust or coke dust and the stoichiometric quantity of water vapor required to form water gas. Hydrogen and additional carbon monoxide are formed in reactor 8 and a gas mixture 10 leaves reactor 8 which consists substantially of carbon monoxide and hydrogen. Gas mixture 10 is dedusted in one or a plurality of series-connected hot cyclones 11 so that there will be no clogging in reduction furnace 1.

Gas mixture 10 is a first reducing gas stream and together with a second gas reducing stream 20 form the reducing gas 24 which enters reduction furnace 1. Reduction furnace 1 may be designed as a single or multiple stage furnace. An exhaust gas 12 leaves reduction furnace 1 and contains a considerable portion of unoxidized components such as CO and $H_2$. Exhaust gas stream 12 after passage through a conventional dust removal device 13, is divided into a partial gas stream 16 and a partial gas stream 17 which is further treated to form second reducing gas stream 20. The unoxidized components in gas stream 17 are substantially returned to the reduction process in reduction furnace 1 after water and carbon dioxide have been removed in device 14 according to known processes.

Before partial gas stream 17 is returned to reduction furnace 1, the ratio of carbon monoxide and hydrogen in this gas stream is corrected according to the requirements of the reduction process by subjecting it to a water gas reaction in a reactor 15 so that carbon dioxide and hydrogen are formed from the carbon monoxide and water. Partial stream 16 of the gas stream 12 is combusted with an air stream 19 in a heat exchange reactor 18. The heat released in this process is utilized to heat partial gas stream 17 and thereby form second reducing gas stream 20. A certain portion of exhaust gas stream 12 must always be removed, for example, in the form of partial stream 16, in order to prevent the enrichment of gaseous impurities (e.g. nitrogen) and in order to compensate for fluctuations in the quantity of gas. The purified partial gas stream 17 is heated in heat exchange reactor 18 to a temperature which is sufficient to obtain a temperature between 600° and 1100° C when gases 20 and 10 are mixed upon introduction into reduction furnace 1. If the quantity of heat produced by the combustion of partial gas stream 16 is not sufficient to heat partial gas stream 17 to a high enough temperature, additional fuel can be burnt in heat exchange reactor 18 or nuclear process heat can be added. A portion of exhaust gas stream is circulated and introduced into reduction furnace 1 as gas stream 20 because in this way it is possible to introduce the required heat into reduction furnace 1 in an advantageous manner.

The melting vessel 4 is operated continuously and has one discharge opening for liquid metal 30 and one for slag 32. In order to form an easy to handle and metallurgically effective slag, additives, such as lime, for example, may be added to the melt.

Due to the continuous operation of the process it is advisable to move part of the metallurgical work, after melting of the sponge iron, to a further melting vessel or refining converter 22 where the steel is re-refined, deoxidized and possibly alloyed before it is cast in casting system 26.

Thus, generally a liquid preliminary steel is taken from an outlet 21 of melting vessel 4 and is fed to refining converter 22 where the preliminary steel is blown with oxygen from an oxygen tank to obtain a desired or required final carbon content. The slag present in melting vessel 4, which consists of additives, mineral components of the sponge iron and of the coal, as well as of metal oxides, is discharged from melting vessel 4 through outlet 25. In order to start up melting vessel 4, liquid pig iron can be furnished in pans or is premelted in a smaller melting oven.

If malfunctions in melting vessel 4 should occur, the sponge iron produced in reduction furnace 1 can be cooled and stored in a storage vessel 23.

It will be understood that the above description of the present invention is susceptible to various modifications, changes and adaptations, and the same are intended to be comprehended within the meaning and range of equivalents of the appended claims.

What is claimed is:

1. A process for producing steel from iron oxide-containing raw materials which comprises the steps of:
   a. initially converting the raw materials, in a reduction furnace by direct reduction with a reducing gas, to a substantially metallized sponge iron;
   b. separating the sponge iron formed in the reduction furnace from exhaust reduction gas which forms during the reduction in the reduction furnace and transporting the separated sponge iron into a metal melt of iron in a melting vessel;
   c. melting and finally reducing the sponge iron in the metal melt with carbonaceous material which is introduced into the metal melt and with oxygen introduced into the metal melt via an oxygen-containing gas, with heat and strongly-heated carbon monoxide-containing exhaust gas being formed in the melting vessel due to the reaction of the oxygen with the carbonaceous material, said carbonaceous material and oxygen-containing gas being introduced into the metal melt below the surface of the metal melt in immediate proximity to each other;
   d. reacting the entire strongly-heated carbon monoxide-containing exhaust gas from the melting vessel in a reactor by adding to said exhaust gas from the melting vessel (1) carbonaceous material and (2) water vapor and/or carbon dioxide to form a first reducing gas stream;
   e. introducing the first reducing gas stream into the reduction furnace as reducing gas for the direct reduction of the iron oxide-containing raw materials;
   f. conducting a portion of the exhaust gas formed in the direct reduction furnace through a gas processing system to form a second reducing gas stream; and
   g. introducing the second reducing gas stream into the reduction furnace as reducing gas for the direct reduction of the iron oxide-containing raw materials.

2. The process according to claim 1 wherein the melt, after melting of the sponge iron, is transferred to a further vessel where it is further processed into steel.

3. Process as defined in claim 1 wherein the exhaust gas from the melting vessel is introduced into the reactor at a temperature of from 1400° to 1600° C and leaves the reactor at the temperature of from 800° to 1100° C required for the direct reduction.

4. Method as defined in claim 1 wherein at least one multiple jacket nozzle is used to introduce the oxygen and the carbonaceous material into the metal melt.

5. Process as defined in claim 1 wherein the first reducing gas stream is conditioned before it is introduced into the reduction furnace.

6. Process as defined in claim 1 wherein the melting vessel is designed as a pressure vessel.

7. Process as defined in claim 1 wherein the conditioning comprises removing dust from the first reducing gas stream.

8. Process as defined in claim 1 wherein a portion of the exhaust gas from the reduction furnace that is not used to form the second reducing gas stream is combusted and used to heat the second reducing gas stream.

9. Process as defined in claim 1 wherein the exhaust gas in the melting vessel is under a pressure of from 0.5 to 5 atmospheres gauge.

10. Process as defined in claim 1 wherein the carbonaceous material added to the metal melt is a solid, fine-grained, carbonaceous material.

11. Process as defined in claim 10 wherein the solid, fine-grained carbonaceous material comprises coal dust.

12. Process as defined in claim 10 wherein the solid, fine-grained carbonaceous material comprises coke dust.

13. Process as defined in claim 1 wherein the carbonaceous material added to the reactor for reaction with the exhaust gas of the melting vessel is coal dust.

14. Method as defined in claim 1 wherein during refining with pure oxygen the carbon content of the metal melt in which the sponge iron is being melted does not drop below 0.1%.

* * * * *